United States Patent
Gupta et al.

(10) Patent No.: US 10,108,700 B2
(45) Date of Patent: Oct. 23, 2018

(54) QUESTION ANSWERING TO POPULATE KNOWLEDGE BASE

(71) Applicant: GOOGLE INC., Mountain View, CA (US)

(72) Inventors: Rahul Gupta, Mountain View, CA (US); Shaohua Sun, Palo Alto, CA (US); John Blitzer, Mountain View, CA (US); Dekang Lin, Cupertino, CA (US); Evgeniy Gabrilovich, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 988 days.

(21) Appl. No.: 13/842,606

(22) Filed: Mar. 15, 2013

(65) Prior Publication Data

US 2014/0280307 A1    Sep. 18, 2014

(51) Int. Cl.
*G06F 17/30*    (2006.01)
*G06N 5/02*    (2006.01)

(52) U.S. Cl.
CPC ....... *G06F 17/30657* (2013.01); *G06N 5/025* (2013.01)

(58) Field of Classification Search
USPC .............. 707/687, 705, 790, 813, 821, 964
See application file for complete search history.

(56) References Cited

U.S. PATENT DOCUMENTS

| | | | |
|---|---|---|---|
| 5,666,502 A | 9/1997 | Capps | |
| 5,819,264 A | 10/1998 | Palmon et al. | |
| 5,946,647 A | 8/1999 | Miller et al. | |
| 6,513,036 B2 | 1/2003 | Fruensgaard et al. | |
| 6,832,218 B1 | 12/2004 | Emens et al. | |
| 6,847,959 B1 | 1/2005 | Arrouye et al. | |
| 6,907,417 B2 * | 6/2005 | Alpert | G06N 5/02 706/55 |
| 6,944,612 B2 | 9/2005 | Roustant et al. | |
| 7,502,770 B2 | 3/2009 | Hillis et al. | |
| 7,562,076 B2 | 7/2009 | Kapur | |
| 7,565,139 B2 | 7/2009 | Neven, Sr. et al. | |

(Continued)

FOREIGN PATENT DOCUMENTS

| | | |
|---|---|---|
| CN | 101341464 A | 1/2009 |
| CN | 102939604 | 2/2013 |

(Continued)

OTHER PUBLICATIONS

Invitation to Pay Additional Fees and, Where Applicable, Protest Fee and Communication of Partial International Search Report, dated Sep. 3, 2014 by the European Patent Office, in PCT International Application PCT/US2014/022598, 8 pgs.

(Continued)

*Primary Examiner* — Sana A Al Hashemi
(74) *Attorney, Agent, or Firm* — Middleton Reutlinger

(57) ABSTRACT

Methods and systems are provided for a question answering. In some implementations, a data element to be updated is identified in a knowledge graph and a query is generated based at least in part on the data element. The query is provided to a query processing engine. Information is received from the query processing engine in response to the query. The knowledge graph is updated based at least in part on the received information.

24 Claims, 10 Drawing Sheets

(56) References Cited

U.S. PATENT DOCUMENTS

| | | | |
|---|---|---|---|
| 7,603,374 | B2 | 10/2009 | Cameron et al. |
| 7,761,414 | B2 | 7/2010 | Freedman |
| 7,765,206 | B2 | 7/2010 | Hillis et al. |
| 7,797,336 | B2 | 9/2010 | Blair et al. |
| 7,818,324 | B1 | 10/2010 | Held et al. |
| 7,895,196 | B2 | 2/2011 | Mahadevan et al. |
| 7,933,900 | B2 | 4/2011 | Reddy et al. |
| 8,005,720 | B2 | 8/2011 | King et al. |
| 8,051,104 | B2 | 11/2011 | Weissman et al. |
| 8,069,175 | B2 | 11/2011 | Hillis et al. |
| 8,086,604 | B2 | 12/2011 | Arrouye et al. |
| 8,204,856 | B2 | 6/2012 | Meyer et al. |
| 8,286,885 | B1 | 10/2012 | Zehr et al. |
| 8,316,029 | B2 | 11/2012 | Lawrence |
| 8,429,103 | B1 | 4/2013 | Aradhye et al. |
| 2002/0083038 | A1 | 6/2002 | Ferrari et al. |
| 2002/0083039 | A1 | 6/2002 | Ferrari et al. |
| 2003/0177136 | A1 | 9/2003 | Alpert |
| 2004/0093321 | A1 | 5/2004 | Roustant et al. |
| 2006/0026147 | A1 | 2/2006 | Cone et al. |
| 2007/0260594 | A1 | 11/2007 | Lewak et al. |
| 2008/0010273 | A1 | 1/2008 | Frank |
| 2008/0126143 | A1 | 5/2008 | Altman et al. |
| 2009/0132316 | A1* | 5/2009 | Florance ............... G06Q 30/06 701/532 |
| 2009/0224867 | A1 | 9/2009 | O'Shaughnessy et al. |
| 2010/0070448 | A1 | 3/2010 | Omoigui |
| 2011/0040776 | A1* | 2/2011 | Najm ............... G06F 17/30648 707/766 |
| 2011/0137883 | A1 | 6/2011 | Lagad et al. |
| 2011/0184981 | A1 | 7/2011 | Lu et al. |
| 2011/0202493 | A1 | 8/2011 | Li |
| 2012/0101858 | A1 | 4/2012 | Depasquale et al. |
| 2012/0101901 | A1 | 4/2012 | Depasquale et al. |
| 2012/0150572 | A1 | 6/2012 | Fredericks et al. |
| 2012/0246153 | A1 | 9/2012 | Pehle |
| 2012/0330906 | A1 | 12/2012 | Fredericks et al. |
| 2013/0054542 | A1 | 2/2013 | Ollenberger et al. |
| 2013/0110833 | A1 | 5/2013 | Fredericks et al. |
| 2013/0318065 | A1* | 11/2013 | Atherton ........... G06F 17/30864 707/709 |
| 2014/0046934 | A1* | 2/2014 | Zhou ................. G06F 17/30991 707/723 |

FOREIGN PATENT DOCUMENTS

| | | |
|---|---|---|
| CN | 102460440 | 10/2014 |
| WO | WO 2001031479 | 5/2001 |
| WO | WO 2006110480 | 10/2006 |
| WO | WO 2010120925 | 10/2010 |
| WO | 2010141502 | 12/2010 |

OTHER PUBLICATIONS

Notification of Transmittal of the International Search Report and the Written Opinion of the International Searching Authority, dated Dec. 4, 2014 by the European Patent Office, in PCT International Application PCT/US2014/022598, 9 pgs.

Kanani, P., et al., "Selecting Actions for Resource-Bounded Information Extraction using Reinforcement Learning", WSDM, ACM 978-1-4503-0747, pp. 253-262 (2012).

Pedro, S. D. S., et al., "Collective Intelligence as a Source for Machine Learning Self-Supervision", WI&C' 12, ACM 978-1-4503, 10 pgs. (2012).

Samadi, M., et al., "Evaluating Correctness of Propositions Using the Web," 4 pgs. (2011).

Jean-Louis, L., Peuplement de bases de connaissances, Approches supervisees et faiblement supervisees pour l'extraction d'evenements complexes et le peuplement de bases de connaissances, Chapter 5, pp. 101-178 (2011).

Nakashole, N., et al., "Real-time Populations of Knowledge Bases: Opportunities and Challenges", Proceedings of the Joint Workshop on Automatic Knowledge Base Construction and Web-scale Knowledge Extraction (ALBC-WEKEX), pp. 41-45 (2012).

Galitsky, B. A., et al., "Learning Ontologies from the Web for Microtext Processing", Association for the Advancement of Artificial Intelligence, pp. 26-31 (2011).

Jannach, D., et al., "Automated ontology instantiation from tabular web sources—The AllRight system", Web Semantics: Science, Services and Agents on the World Wide Web 7pp. 136-153 (2009).

Cimiano, P., et al., "Learning by Googling", SIGKKD Explorations, vol. 6, Issue 2, pp. 24-33 (2004).

Safran, N., "1 out of 5 Google Knowledge Graph Entries for Trending Keywords are Outdated," conductor blog, 4 pgs. (2012).

Steiner, T., et al., "Adding Realtime Coverage to the Google Knowledge Graph," Poster and Demo Proceedings of the 11th International Semantic Web Conference, 4 pgs. (2012).

Heck, L., et al., "Exploiting the Semantic Web for Unsupervised Spoken Language Understanding", IEEE Spoken Language Technology Workshop, pp. 228-233 (2012).

Dekang Lin, "Dependency-based Evaluation of MINIPAR," In Workshop on the Evaluation of Parsing Systems, May 1, 1998, 14 pages, Granada, Spain.

Kao, Wayne, "Telling the Story of Friendships," Facebook, Oct. 28, 2010, available at http://blog.facebook.com/blog.php?post=443390892130, pp. 1-2.

Marie-Catherine De Marneffe, Christopher D. Manning, "Stanford Typed Dependencies Manual," Sep. 2011, 24 pages.

Patanaik, Amaiya, "Open Domain Factoid Question Answering System," Thesis, Indian Institute of Technology—Kharagpur, Department of Electrical Engineering, May 2009, 48 pages.

Rion Snow, Daniel Jurafsky, Andrew Y. Ng, "Learning Syntactic Patterns for Automatic Hypernym Discovery," 2011, 8 pages.

TripIt, "Announcing TripIt—The First Intelligent Travel Organizer for Do-It-Yourself Trip Planners," Concur Technologies Inc., Sep. 18, 2007, available at http://www.tripit.com/press/company-announcements/announcing-tripit-first-intelligent-travel-organizer-do-it-yourself-trip, pp. 1-2.

Veselin Stoyanov, Claire Cardie, Nathan Gilbert, Ellen Riloff, David Buttler, David Hysom, "Reconcile: A Coreference Resolution Research Platform," May 13, 2010, 14 pages.

Notification of First Office Action, Chinese Appl. No. 2014800146124, 12 pages dated May 17, 2017.

Kanani, et al. "Selecting Actions for Resource-bounded Information Extraction using Reinforcement Learning" WSDM Conference. Feb. 2012.

State Intellectual Property Office; Office Action issued in Chinese Appl. No. 2014800146124 dated Jan. 4, 2018.

State Intellectual Property Office; Office Action issued in Chinese Appl. No. 2014800146124 dated Jul. 10, 2018.

\* cited by examiner

QUESTION ANSWERING TO POPULATE KNOWLEDGE BASE

BACKGROUND

This disclosure generally relates to updating information in a database. Data has previously been updated by, for example, user input.

SUMMARY

In some implementations, a system identifies information that is missing from a collection of data. The system generates a question to provide to a question answering service based on the missing information, and uses the response from the question answering service to update the collection of data.

In some implementations, a computer-implemented method is provided. The method includes identifying an entity reference in a knowledge graph, wherein the entity reference corresponds to an entity type. The method further includes identifying a missing data element associated with the entity reference. The method further includes generating a query based at least in part on the missing data element and the type of the entity reference. The method further includes providing the query to a query processing engine. The method further includes receiving information from the query processing engine in response to the query. The method further includes updating the knowledge graph based at least in part on the received information.

In some implementations, a system is provided comprising one or more computers configured to perform operations. Operations include identifying an entity reference in a knowledge graph, wherein the entity reference corresponds to an entity type. Operations further include identifying a missing data element, wherein the data element is associated with the entity reference. Operations further include generating a query based at least in part on the missing data element and the type of the entity reference. Operations further include providing the query to a query processing engine. Operations further include receiving information from the query processing engine in response to the query. Operations further include updating the knowledge graph based at least in part on the received information.

These and other implementations can each include one or more of the following features. In some implementations, identifying a missing data element comprises comparing properties associated with the entity reference to a schema table associated with the entity type. In some implementations, generating the query comprises generating a natural language query. In some implementations, generating the query comprises selecting, from the knowledge graph, disambiguation query terms associated with the entity reference, wherein the terms comprise property values associated with the entity reference. In some implementations, generating the query comprises selecting, from the knowledge graph, disambiguation query terms associated with the entity reference, wherein the terms comprise properties associated with the entity reference. In some implementations, updating the knowledge graph comprises updating the data graph to include information in place of the missing data element.

In some implementations, a computer-implemented method is provided. The method includes identifying an element in a knowledge graph to be updated based at least in part on a query record. The method further includes generating a query based at least in part on the identified element. The method further includes providing the query to a query processing engine. The method further includes receiving information from the query processing engine in response to the query. The method further includes updating the knowledge graph based at least in part on the received information.

In some implementations, a system is provided comprising one or more computers configured to perform operations. Operations include identifying an element in a knowledge graph to be updated based at least in part on a query record. Operations further include generating a query based at least in part on the identified element. Operations further include providing the query to a query processing engine. Operations further include receiving information from the query processing engine in response to the query. Operations further include updating the knowledge graph based at least in part on the received information.

These and other implementations can each include one or more of the following features. In some implementations, the query record comprises data associated with one or more previously performed searches. In some implementations, generating the query comprises generating a natural language query. In some implementations, generating the query comprises selecting, from the knowledge graph, disambiguation query terms associated with the entity reference, wherein the terms comprise property values associated with the entity reference. In some implementations, generating the query comprises selecting, from the knowledge graph, disambiguation query terms associated with the entity reference, wherein the terms comprise properties associated with the entity reference. In some implementations, updating the knowledge graph comprises updating the data graph to include information in place of the missing data element.

DETAILED DESCRIPTION

Figure 1:
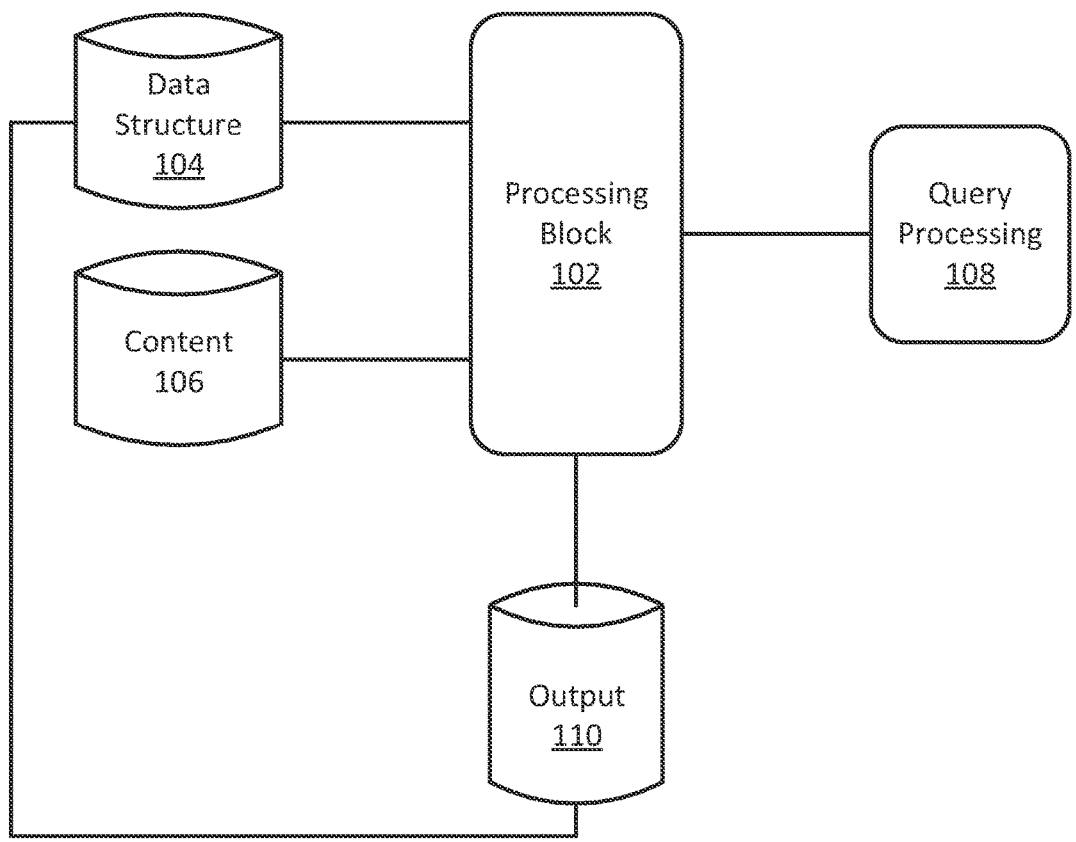
FIG. 1 is a high level block diagram of a system for updating data in a data structure in accordance with some implementations of the present disclosure.

FIG. 1 is a high level block diagram of system 100 for updating data in a data structure in accordance with some implementations of the present disclosure. System 100 includes processing block 102, data structure block 104, content block 106, query processing block 108, and output block 110. System 100 may include any suitable hardware, software, or both for implementing the features described in the present disclosure and will generally be referred to, herein, as "the system."

In some implementations, a particular piece of information in data structure block 104 may be missing, outdated, incorrect, incomplete, or otherwise not as desired. The system may identify the particular information based on, for example, query records or structural information about the data structure. In some implementations, the system uses information from data structure block 104, content block 106, other sources not shown, and any combination thereof, to generate a query that is provided to query processing block 108. Processing block 102 generates the content of output block 108 based on the response from query processing block 108. In some implementations, the system uses output 110 to update data structure block 104.

Data structure block 104 includes a data structure containing structured or otherwise organized information. In some implementations, data structure block 104 contains a data structure, a data graph, a database, an index, any other suitable collection of content, or any combination thereof.

In some implementations, data structure block 104 includes a data graph. In some implementations, a data graph includes data organized in a graph containing nodes and edges. The data of a data graph may include statements about relationships between things and concepts, and those statements may be represented as nodes and edges of a graph. Each nodes of a data graph contains one or more pieces of data, and the edges represent relationships between the data. A knowledge graph, which is a particular implementation of a data graph, is described below in FIGS. 2-4.

Content block 106 includes information related to web sites and other suitable content. In an example, content block 106 includes an index of webpages on the internet containing text, images, videos, links, other suitable content, and any combination thereof. In some implementations, content block 106 includes information from a database, private intranet, public network, private network, any other suitable collection of information, or any combination thereof. In some implementations, content block 106 includes content used by a search engine such as a query processing engine to determine search results.

In some embodiments, content block 106 includes query records. In some embodiments, query records include data related to previous queries. In some implementations, query records include query logs, processed query logs, other suitable processed data related to searches and search history, any other suitable information, or any combination thereof.

Query processing block 108 includes a query processing engine that provides answers to queries. Query processing may include, for example, a search engine, a question answering service, any other suitable query processing, or any combination thereof. For example, query processing block 108 may receive a natural language question as an input and provide a natural language answer as the response, based on information in content 106. For example, in response to the question [What is 1+1?] query processing block 108 may provide the answer [2]. In some implementations, query processing block 108 processes natural language questions, formal language questions, queries formatted in any other suitable manner, or any combination thereof. In some implementations, processing block 102 formats a question such that it can be processed by query processing block 108. In some implementations, processing block 102 includes disambiguation information from data structure 104 in the query. The query processing is performed based on Internet search engine results, automated question answering techniques, responses from human question answerers, indexes of previously answered questions, natural language search parsing, any other suitable query processing technique, or any combination thereof. In some implementations, the answers from query processing block 108 are based on content block 106, data structure block 104, any other suitable content, or any combination thereof.

In some implementations, the system described herein uses natural language processing. As used herein, natural language refers to words, syntax, and other language such as it could be used in conversation or prose. For example, natural language may include complete sentences, questions, idiom, punctuation, any other suitable language elements or structures, or any combination thereof. For example, the question [Who was the first person to fly an airplane?] is a natural language question. In contrast, formal language follows relatively more constrained rules of grammar and syntax. An example of formal language is a computer programming language such as C or BASIC. It will be understood that queries, including natural language queries, may be in any suitable language such as English, French, Chinese, and so on. It will be understood that in some implementations, the system need not receive a natural language query and may receive a query in any suitable form. It will also be understood that the system may receive questions, provide questions for answering, receive responses, provide answers, and perform any other suitable steps using natural language, formal language, keywords, voice, video, images, any other suitable communication technique, or any combination thereof.

Output block 110 corresponds to the answer provided by query processing block 108. In some implementations, processing block 102 generates the content of output block 110 based on the query provided to query processing block 108, the response from query processing block 108, content block 106, data structure block 104, any other suitable content, or any combination thereof. In an example where the query provided to query processing block 108 corresponds to information that the system identifies as missing from data structure block 104, output block 110 may include the missing information. In the example, the system uses the information from output 110 to update data structure block 104.

Figure 2:
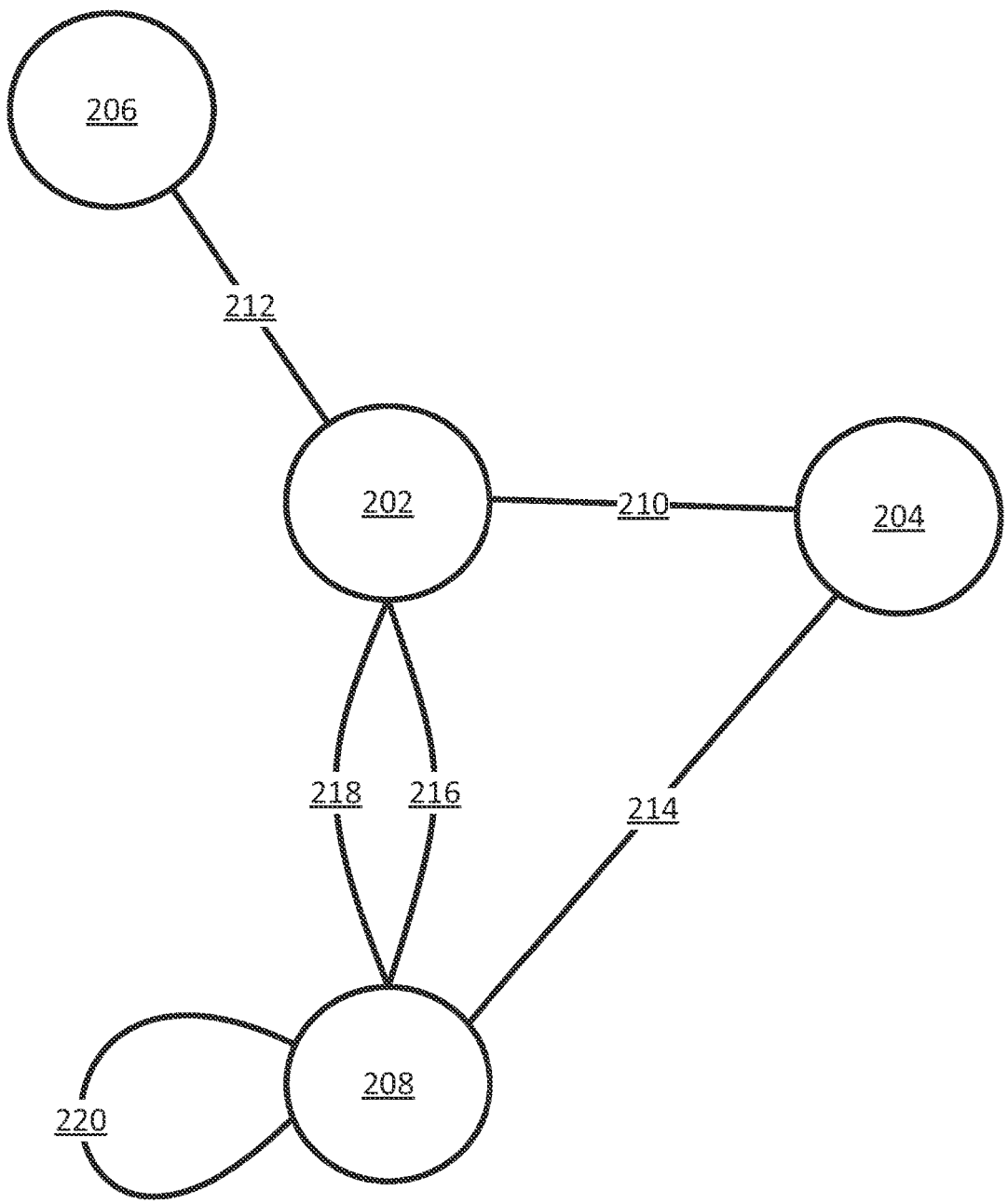
FIG. 2 shows an illustrative data graph portion containing nodes and edges in accordance with some implementations of the present disclosure.

FIG. 2 shows an illustrative data graph containing nodes and edges in accordance with some implementations of the present disclosure. In some implementations, data in data structure 104 of FIG. 1 is stored as a data graph. In some implementations, illustrative data graph 200 is a portion of a knowledge graph. The knowledge graph is a particular implementation of a data graph and will be described in further detail in relation to FIGS. 3 and 4 below. It will be understood that the data graph implementation of FIG. 2, and the knowledge graph, are merely examples of a data structure that may be used by the system to store entity references and other data, and that any suitable data format may be used. For example, data in data structure 104 of FIG. 1 may be stored as a list of entities and associated entity types. Data stored by the data structure may include any suitable data such as references to data, text, images, characters, computer files, databases, any other suitable data, or any combination thereof. It will be understood that in some implementations, the node and edge description is merely illustrative and that the construction of the data structure may include any suitable technique for describing information and relationships. In an example, nodes may be assigned a unique identification number, and an edge may be described using the identification numbers that a particular edge connects. It will be understood that the representation of data as a graph is merely exemplary and that data may be stored, for example, as a computer file including pieces of data and links and/or references to other pieces of data.

In some implementations, data may be organized in a database using any one or more data structuring techniques. For example, data may be organized in a graph containing nodes connected by edges. In some implementations, the data may include statements about relationships between things and concepts, and those statements may be represented as nodes and edges of a graph. The nodes each contain a piece or pieces of data and the edges represent relationships between the data contained in the nodes that the edges connect. In some implementations, the graph includes one or more pairs of nodes connected by an edge. The edge, and thus the graph, may be directed, i.e. unidirectional, undirected, i.e. bidirectional, or both, i.e. one or more edges may be undirected and one or more edges may be directional in the same graph. Nodes may include any suitable data or data representation. Edges may describe any suitable relationships between the data. In some implementations, an edge is labeled or annotated, such that it includes both the connection between the nodes, and descriptive information about that connection. A particular node may be connected by distinct edges to one or more other nodes, or to itself, such that an extended graph is formed. For purposes of clarity, a graph based on the structure described immediately above is referred to herein as a knowledge graph. In some implementations, the knowledge graph may be a useful for representing information and in providing information in search.

FIG. 2 shows illustrative knowledge graph 200 containing nodes and edges. Illustrative knowledge graph 200 includes nodes 202, 204, 206, and 208. Knowledge graph 200 includes edge 210 connecting node 202 and node 204. Knowledge graph 200 includes edge 212 connecting node 202 and node 206. Knowledge graph 200 includes edge 214 connecting node 204 and node 208. Knowledge graph 200 includes edge 216 and edge 218 connecting node 202 and node 208. Knowledge graph 200 includes edge 220 connecting node 208 to itself. Each aforementioned group of an edge and one or two distinct nodes may be referred to as a triple or 3-tuple. As illustrated, node 202 is directly connected by edges to three other nodes, while nodes 204 and 208 are directly connected by edges to two other nodes. Node 206 is connected by an edge to only one other node, and in some implementations, node 206 is referred to as a terminal node. As illustrated, nodes 202 and 208 are connected by two edges, indicating that the relationship between the nodes is defined by more than one property. As illustrated, node 208 is connected by edge 220 to itself, indicating that a node may relate to itself. While illustrative knowledge graph 200 contains edges that are not labeled as directional, it will be understood that each edge may be unidirectional or bidirectional. It will be understood that this example of a graph is merely an example and that any suitable size or arrangement of nodes and edges may be employed.

Generally, nodes in a knowledge graph can be grouped into several categories. Nodes may represent entities, organizational data such as entity types and properties, literal values, and models of relationships between other nodes. A node of a knowledge graph may represent an entity, as defined above.

In some implementations, entity types, properties, and other suitable content is created, defined, redefined, altered, or otherwise generated by any suitable technique. For example, content may be generated by manual user input, by automatic responses to user interactions, by importation of data from external sources, by any other suitable technique, or any combination thereof. For example, if a commonly searched for term is not represented in the knowledge graph, one or more nodes representing that node may be added. In another example, a user may manually add information and organizational structures.

A node representing organizational data may be included in a knowledge graph. These may be referred to herein as entity type nodes. As used herein, an entity type node may refer to a node in a knowledge graph, while an entity type may refer to the concept represented by an entity type node. An entity type may be a defining characteristic of an entity. For example, entity type node Y may be connected to an entity node X by an [Is A] edge or link, discussed further below, such that the graph represents the information "The Entity X Is Type Y." For example, the entity node [George Washington] may be connected to the entity type node [President]. An entity node may be connected to multiple entity type nodes, for example, [George Washington] may also be connected to entity type node [Person] and to entity type node [Military Commander]. In another example, the entity type node [City] may be connected to entity nodes [New York City] and [San Francisco]. In another example, the concept [Tall People], although incompletely defined, i.e., it does not necessarily include a definition of the property [tall], may exist as an entity type node. In some implementations, the presence of the entity type node [Tall People], and other entity type nodes, may be based on user interaction.

In some implementations, an entity type node may include or be connected to data about: a list of properties associated with that entity type node, the domain to which that entity type node belongs, descriptions, values, any other suitable information, or any combination thereof. A domain refers to a collection of related entity types. For example, the domain [Film] may include, for example, the entity types [Actor], [Director], [Filming Location], [Movie], any other suitable entity type, or any combination thereof. In some implementations, entities are associated with types in more than one domain. For example, the entity node [Benjamin Franklin] may be connected with the entity type node [Politician] in the domain [Government] as well as the entity type node [Inventor] in the domain [Business].

In some implementations, properties associated with entity nodes or entity type nodes may also be represented as nodes. For example, nodes representing the property [Population] or [Location] may be connected to the entity type node [City]. The combination and/or arrangement of an entity type and its properties is referred to as a schema. In some implementations, schemas are stored in tables or other suitable data structures associated with an entity type node. In some implementations, the knowledge graph may be self-defining or bootstrapping, such that it includes particular nodes and edges that define the concept of nodes, edges, and the graph itself. For example, the knowledge graph may contain an entity node [Knowledge Graph] that is connected to property nodes that describe a knowledge graph's properties such as [Has Nodes] and [Has Edges].

Specific values, in some implementations referred to as literals, may be associated with a particular entity in a terminal node by an edge defining the relationship. Literals may refer to values and/or strings of information. For example, literals may include dates, names, and/or numbers. In an example, the entity node [San Francisco] may be connected to a terminal node containing the literal [813000] by an edge annotated with the property [Has Population]. In some implementations, terminal nodes may contain a reference or link to long text strings and other information stored in one or more documents external to the knowledge graph. In some implementations, literals are stored as nodes in the knowledge graph. In some implementations, literals are stored in the knowledge graph but are not assigned a unique identification reference as described below, and are not capable of being associated with multiple entities. In some implementations, literal type nodes may define a type of literal, for example [Date/Time], [Number], or [GPS Coordinates].

In some implementations, the grouping of an edge and two nodes is referred to as a triple. The triple represents the relationship between the nodes, or in some implementations, between the node and itself. In some implementations, higher order relationships are modeled, such as quaternary and n-ary relationships, where n is an integer greater than 2. In some implementations, information modeling the relationship is stored in a node, which may be referred to as a mediator node. In an example, the information "Person X Donates Artifact Y To Museum Z" is stored in a mediator node connected entity nodes to X, Y, and Z, where each edge identifies the role of each respective connected entity node.

In some implementations, the knowledge graph may include information for differentiation and disambiguation of terms and/or entities. As used herein, differentiation refers to the many-to-one situation where multiple names are associated with a single entity. As used herein, disambiguation refers to the one-to-many situation where the same name is associated with multiple entities. In some implementations, nodes may be assigned a unique identification reference. In some implementations, the unique identification reference may be an alphanumeric string, a name, a number, a binary code, any other suitable identifier, or any combination thereof. The unique identification reference may allow the system to assign unique references to nodes with the same or similar textual identifiers. In some implementations, the unique identifiers and other techniques are used in differentiation, disambiguation, or both.

In some implementations of differentiation, a node may be associated with multiple terms or differentiation aliases in which the terms are associated with the same entity. For example, the terms [George Washington], [Geo. Washington], [President Washington], and [President George Washington] may all be associated with a single entity, i.e., node, in the knowledge graph. This may provide differentiation and simplification in the knowledge graph.

In some implementations of disambiguation, multiple nodes with the same or similar names are defined by their unique identification references, by associated nodes in the knowledge graph, by any other suitable information, or any combination thereof. For example, there may be an entity node related to the city [Philadelphia], an entity node related to the movie [Philadelphia], and an entity node related to the cream cheese brand [Philadelphia]. Each of these nodes may have a unique identification reference, stored for example as a number, for disambiguation within the knowledge graph.

In some implementations, disambiguation in the knowledge graph is provided by the connections and relationships between multiple nodes. For example, the city [New York] may be disambiguated from the state [New York] because the city is connected to an entity type [City] and the state is connected to an entity type [State]. It will be understood that more complex relationships may also define and disambiguate nodes. For example, a node may be defined by associated types, by other entities connected to it by particular properties, by its name, by any other suitable information, or any combination thereof. These connections may be useful in disambiguation. For example, the graph may include two [Georgia] nodes, corresponding respectively to the U.S. State and the Eastern European country. The node [Georgia] that is connected to the node [United States] may be understood represent the U.S. State, while the node [Georgia] connected to the nodes [Asia] and [Eastern Europe] may be understood to represent the country in eastern Europe.

In some implementations, a node may include or connect to data defining one or more attributes. The attributes may define a particular characteristic of the node. The particular attributes of a node may depend on what the node represents. In some implementations, an entity node may include or connect to: a unique identification reference, a list of entity types associated with the node, a list of differentiation aliases for the node, data associated with the entity, a textual description of the entity, links to a textual description of the entity, other suitable information, or any combination thereof. As described above, nodes may contain a reference or link to long text strings and other information stored in one or more documents external to the knowledge graph. In some implementations, the storage technique may depend on the particular information. For example, a unique identification reference may be stored within the node, a short information string may be stored in a terminal node as a literal, and a long description of an entity may be stored in an external document linked to by a reference in the knowledge graph.

An edge in a knowledge graph may represent a semantic connection defining a relationship between two nodes. The edge may represent a prepositional statement such as [Is A], [Has A], [Is Of A Type], [Has Property], [Has Value], any other suitable statement, or any combination thereof. For example, the entity node of a particular person may be connected by a [Date Of Birth] edge to a terminal node containing a literal of his or her specific date of birth. In some implementations, the properties defined by edge connections of an entity may relate to nodes connected to the type of that entity. For example, the entity type node [Movie] may be connected to entity nodes [Actor] and [Director], and a particular movie may be connected by an edge property [Has Actor] to an entity node representing a particular actor.

In some implementations, nodes and edges define the relationship between an entity type node and its properties, thus defining a schema. For example, an edge may connect an entity type node to a node associated with a property, which may be referred to as a property node. Entities of the type may be connected to nodes defining particular values of those properties. For example, the entity type node [Person] may be connected to property node [Date of Birth] and a node [Height]. Further, the node [Date of Birth] may be connected to the literal type node [Date/Time], indicating that literals associated with [Date of Birth] include date/time information. The entity node [George Washington], which is connected to entity type node [Person] by an [Is A] edge, may also be connected to a literal [Feb. 22, 1732] by the edge [Has Date Of Birth]. In some implementations, the entity node [George Washington] is connected to a [Date Of Birth] property node. It will be understood that in some implementations, both schema and data are modeled and stored in a knowledge graph using the same technique. In this way, both schema and data can be accessed by the same search techniques. In some implementations, schemas are stored in a separate table, graph, list, other data structure, or any combination thereof. It will also be understood that properties may be modeled by nodes, edges, literals, any other suitable data, or any combination thereof.

For example, the entity node [George Washington] may be connected by an [Is A] edge to the entity type node representing [Person], thus indicating an entity type of the entity, and may also be connected to a literal [Feb. 22, 1732] by the edge [Has Date Of Birth], thus defining a property of the entity. In this way, the knowledge graph defines both entity types and properties associated with a particular entity by connecting to other nodes. In some implementations, [Feb. 22, 1732] may be a node, such that it is connected to other events occurring on that date. In some implementations, the date may be further connected to a year node, a month node, and a day of node. It will be understood that this information may be stored in any suitable combination of literals, nodes, terminal nodes, interconnected entities, any other suitable arrangement, or any combination thereof.

Figure 3:
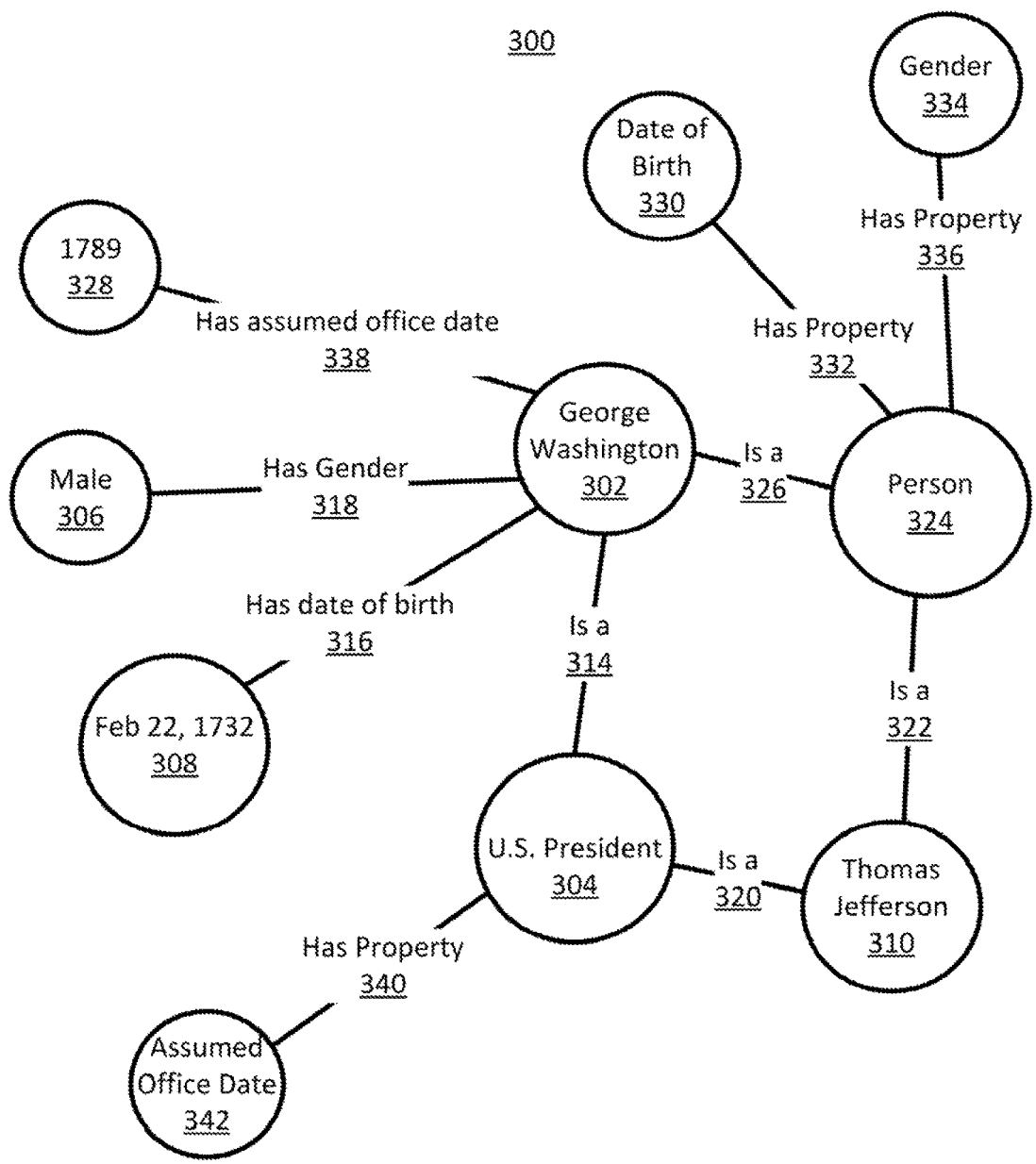
FIG. 3 shows an illustrative knowledge graph portion in accordance with some implementations of the present disclosure.

FIG. 3 shows illustrative knowledge graph portion 300 in accordance with some implementations of the present disclosure. Knowledge graph portion 300 includes information related to the entity [George Washington], represented by [George Washington] node 302. [George Washington] node 302 is connected to [U.S. President] entity type node 304 by [Is A] edge 314 with the semantic content [Is A], such that the 3-tuple defined by nodes 302 and 304 and the edge 314 contains the information "George Washington is a U.S. President." Similarly, "Thomas Jefferson Is A U.S. President" is represented by the tuple of [Thomas Jefferson] node 310, [Is A] edge 320, and [U.S. President] node 304. Knowledge graph portion 300 includes entity type nodes [Person] 324, and [U.S. President] node 304. The person type is defined in part by the connections from [Person] node 324. For example, the type [Person] is defined as having the property [Date Of Birth] by node 330 and edge 332, and is defined as having the property [Gender] by node 334 and edge 336. These relationships define in part a schema associated with the entity type [Person].

[George Washington] node 302 is shown in knowledge graph portion 300 to be of the entity types [Person] and [U.S. President], and thus is connected to nodes containing values associated with those types. For example, [George Washington] node 302 is connected by [Has Gender] edge 318 to [Male] node 306, thus indicating that "George Washington has gender Male." Further, [Male] node 306 may be connected to the [Gender] node 334 indicating that "Male Is A Type Of Gender." Similarly, [George Washington] node 302 is connected by [Has Date of Birth] edge 316 to [Feb. 22, 1732] node 308, thus indicating that "George Washington Has Date Of Birth Feb. 22, 1732." [George Washington] node 302 may also be connected to [1789] node 328 by [Has Assumed Office Date] edge 338.

Knowledge graph portion 300 also includes [Thomas Jefferson] node 310, connected by [Is A] edge 320 to entity type [U.S. President] node 304 and by [Is A] edge 322 to [Person] entity type node 324. Thus, knowledge graph portion 300 indicates that "Thomas Jefferson" has the entity types "U.S. President" and "Person." In some implementations, [Thomas Jefferson] node 310 is connected to nodes not shown in FIG. 3 referencing his date of birth, gender, and assumed office date.

It will be understood that knowledge graph portion 300 is merely an example and that it may include nodes and edges not shown. For example, [U.S. President] node 304 may be connected to all of the U.S. Presidents. [U.S. President] node 304 may also be connected to properties related to the entity type such as a duration of term, for example [4 Years], a term limit, for example [2 Terms], a location of office, for example [Washington D.C.], any other suitable data, or any combination thereof. For example, [U.S. President] node 304 is connected to [Assumed Office Date] node 342 by [Has Property] edge 340, defining in part a schema for the type [U.S. President]. Similarly, [Thomas Jefferson] node 310 may be connected to any suitable number of nodes containing further information related to his illustrated entity type nodes [U.S. President], and [Person], and to other entity type nodes not shown such as [Inventor], [Vice President], and [Author]. In a further example, [Person] node 324 may be connected to all entities in the knowledge graph with the type [Person]. In a further example, [1789] node 328 may be connected to all events in the knowledge graph with the property of year [1789]. [1789] node 328 is unique to the year 1789, and disambiguated from, for example, a book entitled [1789], not shown in FIG. 3, by its unique identification reference. In some implementations, [1789] node 328 is connected to the entity type node [Year].

Figure 4:
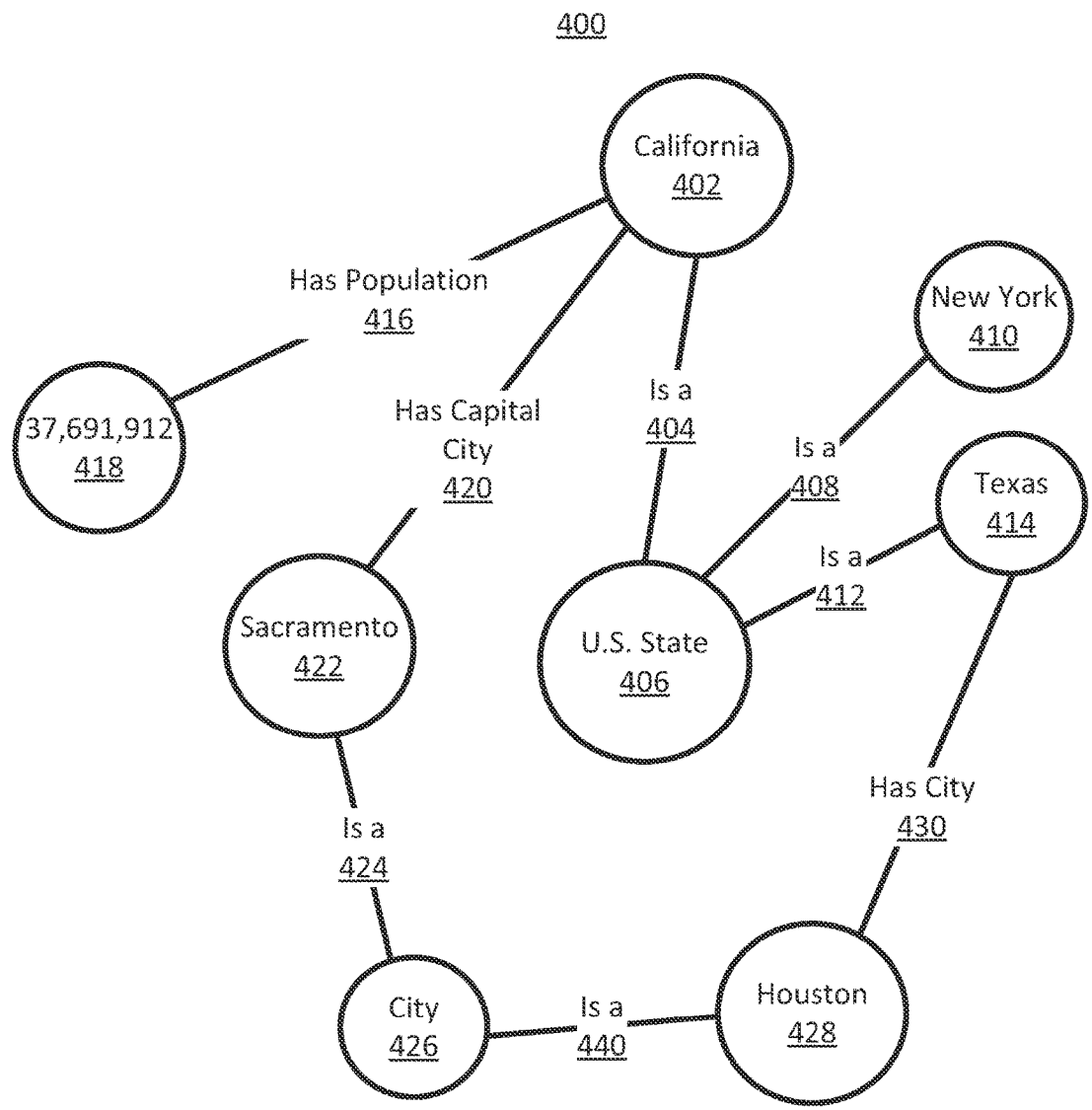
FIG. 4 shows another illustrative knowledge graph portion in accordance with some implementations of the present disclosure.

FIG. 4 shows illustrative knowledge graph portion 400 in accordance with some implementations of the present disclosure. Knowledge graph portion 400 includes [California] node 402, which may also be associated with differentiation aliases such as, for example, [CA], [Calif.], [Golden State], any other suitable differentiation aliases, or any combination thereof. In some implementations, these differentiations are stored in [California] node 402. California is connected by [Is A] edge 404 to the [U.S. State] entity type node 406. [New York] node 410 and [Texas] node 414 are also connected to [U.S. State] node 406 by [Is A] edges 408 and 412, respectively. [California] node 402 is connected by [Has Capital City] edge 420 to [Sacramento] node 422, indicating the information that "California Has Capital City Sacramento." Sacramento node 422 is further connected by [Is A] edge 424 to the [City] entity type node 426. Similarly, [Texas] node 414 is connected by [Has City] edge 430 to [Houston] node 428, which is further connected to the [City] entity type node 426 by [Is A] edge 340. [California] node 402 is connected by [Has Population] edge 416 to node 418 containing the literal value [37,691,912]. In an example, the particular value [37,691,912] may be periodically automatically updated by the knowledge graph based on an external website or other source of data. Knowledge graph portion 400 may include other nodes not shown. For example, [U.S. State] entity type node 406 may be connected to nodes defining properties of that type such as [Population] and [Capital City]. These type-property relationships may be used to define other relationships in knowledge graph portion 400 such as [Has Population] edge 416 connecting entity node [California] 402 with terminal node 418 containing the literal defining the population of California.

It will be understood that while knowledge graph portion 300 of FIG. 3 and knowledge graph portion 400 of FIG. 4 below show portions of a knowledge graph, all pieces of information may be contained within a single graph and that these selections illustrated herein are merely an example. In some implementations, separate knowledge graphs are maintained for different respective domains, for different respective entity types, or according to any other suitable delimiting characteristic. In some implementations, separate knowledge graphs are maintained according to size constraints. In some implementations, a single knowledge graph is maintained for all entities and entity types.

A knowledge graph may be implemented using any suitable software constructs. In an example, a knowledge graph is implemented using object oriented constructs in which each node is an object with associated functions and variables. Edges, in this context, may be objects having associated functions and variables. In some implementations, data contained in a knowledge graph, pointed to by nodes of a knowledge graph, or both, is stored in any suitable one or more data repositories across one or more servers located in one or more geographic locations coupled by any suitable network architecture.

Figure 5:
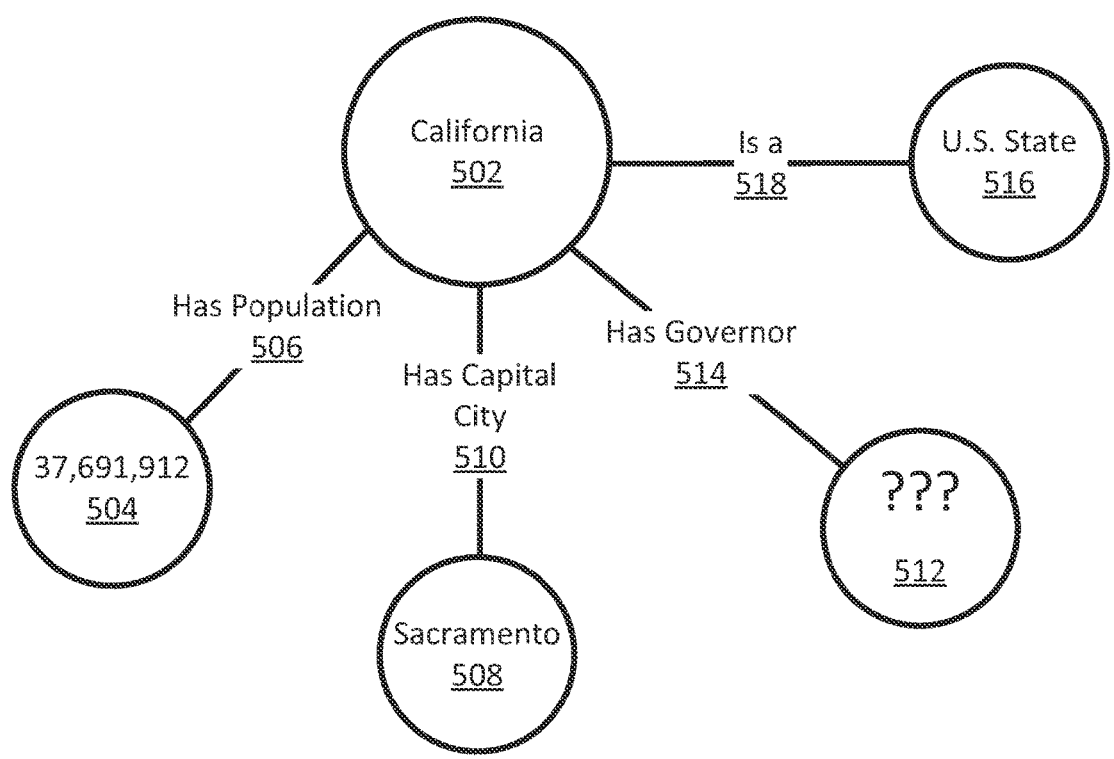
FIG. 5 shows an illustrative knowledge graph portion with missing information in accordance with some implementations of the present disclosure.

FIG. 5 shows illustrative knowledge graph portion 500 with missing information in accordance with some implementations of the present disclosure. Illustrative knowledge graph portion 500 includes missing information in [???] node 512 that the system may update.

Knowledge graph portion 500 includes [California] node 502. [California] node 502 is connected by [Is A] edge 518 to [U.S. State] node 516. In some implementations, this indicates that [U.S. State] is an entity type associated with the entity reference [California]. Entity type [U.S. State] may be associated with a schema including properties such as [Population], [Capital City], [Governor], and other properties that are used to describe entity references of that entity type. As shown, [California] node 502 is connected by [has population] edge 506 to [37,691,912] node 504, indicating that California has the population 37,691,912. [California] node 502 is connected by [Has Capital City] edge 510 to [Sacramento] node 508. [Has Governor] edge 514 is connected to [???] node 512, indicating that this information is not known. It will be understood that [???] is a placeholder and that the node may be missing, may be blank, may contain a null value, may be marked in some way indicating that the information is missing, incomplete, or of questionable quality, may contain any other suitable content, or any combination thereof.

In some implementations, the system identifies [???] node 512 as a missing data element in the knowledge graph. In some implementations, the system identifies the missing element based on a schema associated with the entity type U.S. State. For example, the system may expect to find population, capital city, and governor information for the entity reference California, while only the population and capital city information are present in the knowledge graph. The missing element may be identified by a crawling operation or other traversal of the knowledge graph, wherein expected properties of a particular entity reference are compared to the properties found in the knowledge graph.

In some implementations, the system identifies the missing element based on one or more query records. A query record is a history of searches performed by users. For example, a query record may include aggregated Internet search history information. In some implementations, a query record may include searches that were not answered by data in the knowledge graph. In some implementations, the occurrence of queries for which answers are not present in the knowledge graph may indicate that the information is missing. In another example, the presence of a query that does have a corresponding entry in the knowledge graph may indicate that the entry should be updated. In another example, not shown, [???] node 512 includes information that is determined to be outdated based on query records.

Figure 6:
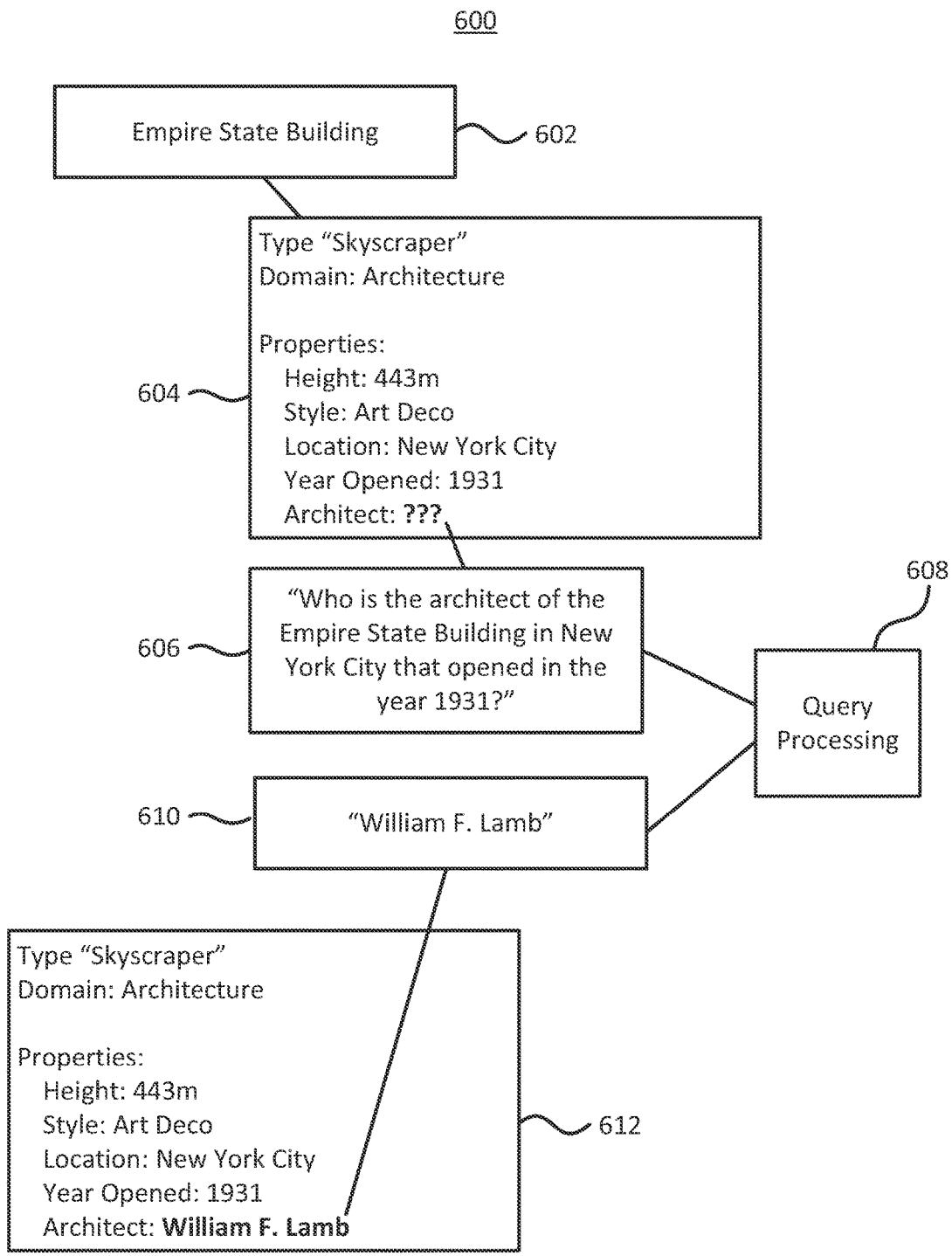
FIG. 6 shows an exemplary sequence for updating data using a query processing engine in accordance with some implementations of the present disclosure.

FIG. 6 shows exemplary sequence 600 for updating data using a query processing engine in accordance with some implementations of the present disclosure.

Box 602 includes entity reference [Empire State Building]. In some implementations, the entity reference is an entity reference in a knowledge graph. For example, [California] node 502 of FIG. 5 may be an entity reference.

Box 604 shows information stored in a data structure associated with the entity reference of box 604. As illustrated, the entity reference [Empire State Building] has the type [Skyscraper]. The entity type [Skyscraper] is in the domain [Architecture] and has the properties [Height], [Style], [Location], [Year Opened], and [Architect]. Properties are associated with property values, which in some implementations are literals as described above. As illustrated, [Empire State Building] has height property value [443 m], has style property value [Art Deco], has location property value [New York City], and has year opened date property value [1931]. Also as shown, the architect property value associated with [Empire State Building] is unknown. This is indicated by the entry [???] in box 604. As described above for [???] node 512, the missing information may be represented in any suitable manner.

In some implementations, the system generates a query to which the expected answer will complete the missing [Architect] information of box 604. Box 606 includes natural language search query [Who is the architect of the Empire State Building in New York City that opened in the year 1931?]. It will be understood that the query need not be a natural language search query. As illustrated, the query includes the entity reference [Empire State Building], the property of the missing information [Architect], and other information that is known such as [New York City] and [year 1931]. In some implementations, the additional information serves as disambiguation information in the search query. For example, it may help to distinguish between the particular Empire State Building in Manhattan, other buildings in the Empire State, a book titled "Empire State Building," and a documentary movie titled "Empire State Building." In some implementations, the system may translate knowledge graph information from box 604 to natural language in order to generate the search query. For example, the information from box 604 [Location: New York City] is converted to the query terms [in New York City] in box 606.

In some implementations, the name of a property, for example [Location] is included in the query. In some implementations, a property value, for example [New York City], is included in a query. In some implementations, both properties and property values are included in a query. In some implementations, the system may determine to include a property or property value for a particular query based on information stored in a schema, based on an entity type associated with the entity reference, based on a domain associated with the entity reference, based on any other suitable information, or any combination thereof.

The particular pieces of information from box 604 included in the query of box 606 are selected using any suitable technique. In some implementations, the system selects the information based on an iterative process where pieces of information are successively added to, replaced in and/or removed from the query until subsequent steps of the process produce a suitable result. For example, if the query [Who is the architect of the Empire State Building] returns ambiguous results, the system may add [in New York City] to the query in order to use a more specific search. This process is repeated until an acceptable result is determined based on the query. In an example, the system selects properties to add or remove based on their uniqueness, that is, how often the same information appears associated with that property for other entity references. For example, [New York City] may be relatively common while [Art Deco] is less common, based on the amount a particular property appears in search records, based on any other suitable data, or any combination thereof. In some implementations, the system may include more common information, less common information, or any combination thereof.

Box 608 includes query processing. The query in box 606 is received by box 608 and processed, for example, as described above for query processing 108 of FIG. 1. The query processing of box 608 generates an output, for example as described for output 110 of FIG. 1. The output [William F. Lamb] is shown in box 610. Thus in the illustrated example, the system has determined the [William F. Lamb] is the answer to the question [Who is the architect of the Empire State Building in New York City that opened in the year 1931?].

Box 612 includes updated information associated with the entity reference in box 602. In some implementations, box 612 represents the information of box 604 after it has been updated based on the output of query processing as shown in box 610. As illustrated, the [???] for Architect shown in box 604 has been replaced with the information [William F. Lamb], indicating that the architect of the Empire State Building is William F. Lamb.

Figure 7:
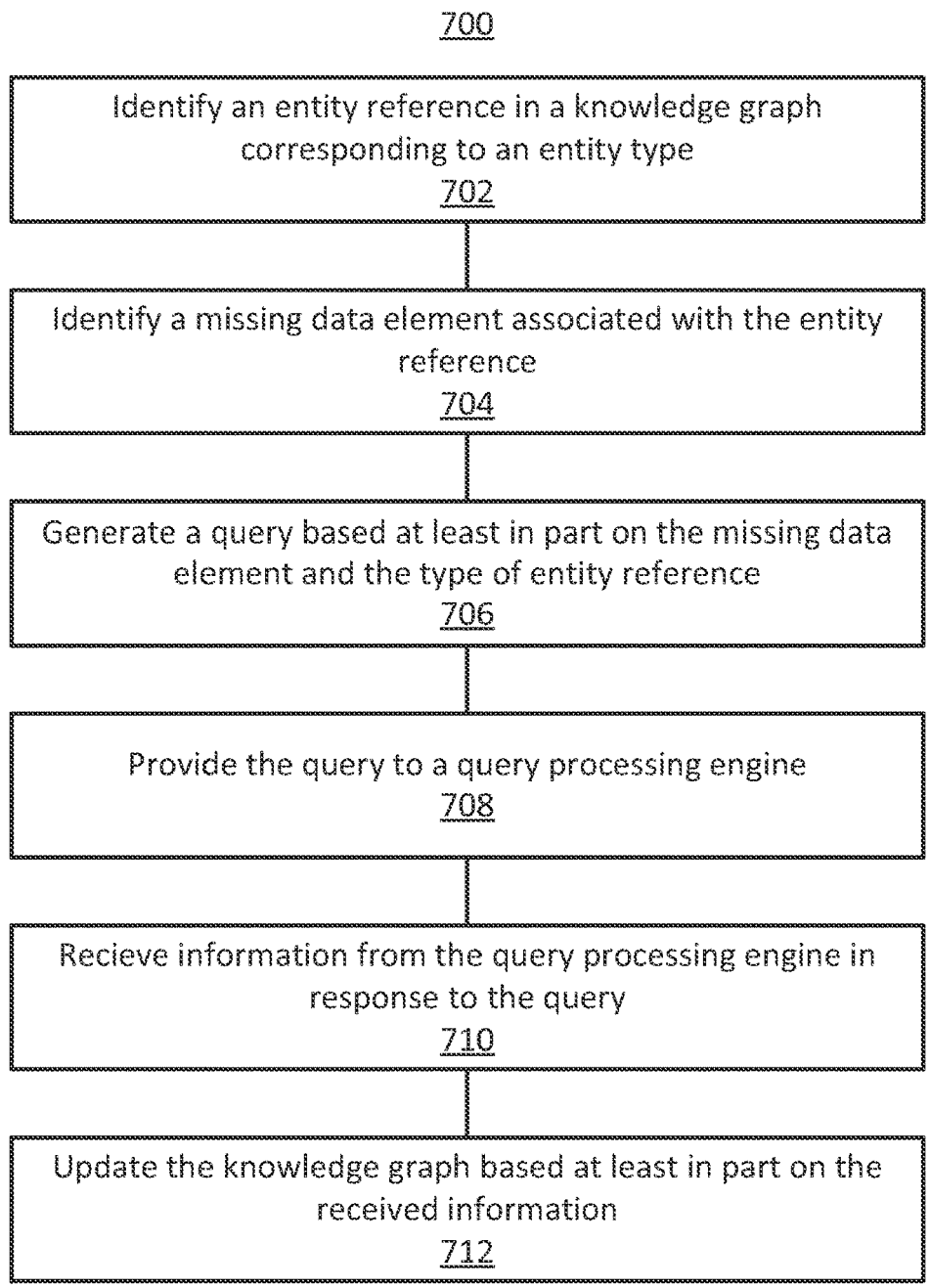
FIG. 7 shows a flow diagram of illustrative steps for updating a data graph based on missing information in accordance with some implementations of the present disclosure.

FIG. 7 shows flow diagram 700 including illustrative steps for updating a data graph based on missing information in a knowledge graph in accordance with some implementations of the present disclosure. In some implementations, the steps of flow diagram 700 correspond in part to sequence 600 of FIG. 6.

In step 702, the system identifies an entity reference corresponding to an entity type. In some implementations, the system identifies an entity reference as described for the entity reference of box 602 of FIG. 6, as described for node 512 of FIG. 5, by any other suitable technique, or any combination thereof. In an example, the system identifies entity references by traversing and/or crawling a graph, that is, following successively linked nodes. In another example, the system identifies entity references based on a statistical process that depends on user interactions, such as where more commonly accessed entity references are identified as the entity reference of step 702. In another example, the system identifies entity references based on a random selection process. It will be understood that the aforementioned techniques are merely exemplary and that the system may identify entity references using any suitable technique or any combination of techniques.

In step 704, the system identifies a missing data element associated with the entity reference. In some implementations, missing data elements include incomplete data elements, outdated data elements, elements that are expected to be in the knowledge graph based on a schema associated with an entity type, any other suitable elements, or any combination thereof. In the illustrated example of FIG. 5, node 512 is a missing data element. In the illustrated example of FIG. 6, the [???] data for [Architect] is a missing data element. In some implementations, the system identifies missing data elements based on a schema for a type associated with the entity reference identified in step 702. In an example, a particular entity reference is associated with a schema that includes 5 properties, for which there is data in the knowledge graph for 4 of those 5 properties. The system may then identify the fifth property for which data is not included as a missing data element.

In step 706, the system generates a query based at least in part on the missing data element and the type of entity reference. In some implementations, the system generates a query as described in relation to box 606 of FIG. 6. In an example, the system generates a natural language search query based on the entity reference of step 702 and the missing data element of step 704. In some embodiments, the system generates more than one query. In some implementations, the system includes disambiguation information in the search query. The system uses disambiguation information to distinguish between entity references in a search with the same or similar search terms. For example, the system may use disambiguation information for the entity reference [Portland] to distinguish in a query between the city of Portland, Oreg., the city of Portland, Me., and the isle of Portland, England. Disambiguation information may include properties such as [Height] and [Style] as illustrated in FIG. 6, properties values such as [443 m] and [Art Deco], both properties and the property values, any other suitable information, and any combination thereof.

In step 708, the system provides the query to a query processing engine. In some implementations, query processing includes processing as described for box 108 of FIG. 1 and/or box 608 of FIG. 6. In some implementations, a query processing engine receives the query generated in step 706. In some embodiments, where more than one query is generated in step 706, some or all of the queries may be provided to a query processing engine. In some implementations, a query processing engine includes a natural language question answering service, a search engine, any other suitable query processing engine, or any combination thereof. In an example, a query processing engine receives a natural language query such as the query shown in box 608 of FIG. 6 and processes the query to determine an answer. The answer may include a single answer, multiple answers, confidence levels associated with one or more answers, links to other information or documents, any other suitable information, and any combination thereof. In some implementations, query processing includes parsing of a query, searching of an index, any other suitable search techniques, and any combination thereof.

In step 710, the system receives information from the query processing engine in response to the query. In some implementations, the response corresponds to the answer or answers generated by the query processing engine in step 708. In an example, box 610 of FIG. 6 illustrates a response received from a query processing engine. In some implementations, the response received represents an answer to the query generated in step 706, where that query is a question. In some implementations, the system receives more than one response to the query from the query processing engine, and selects an answer from the more than one response. For example, the system may select a response that is the highest rated based on a confidence measure.

In an example, for the missing information associated with the property [Governor] identified in FIG. 5, the answers may include the two previous governors, [Arnold Schwarzenegger] and [Jerry Brown]. A confidence measure based on the recency of results may be used to select the most current result, [Jerry Brown]. In some implementations, the system may determine a confidence measure based on information associated with the entity type. For example, the system may use a confidence measure that depends more heavily on recency for the property [Governor], and use a confidence measure that depends more heavily on search result popularity for the property [Capital], because Governor is a property that changes over time and Capital does not change. It will be understood that the aforementioned confidence measures are merely exemplary and that that the system may use any suitable measure or combination of measures including weighted combinations.

In another example, if a response is not received with a confidence measure above a particular confidence threshold, the system need not use the information received. In some implementations, based on the received response, the system may alter, refine, narrow, broaden, or otherwise change the query provided to the query processing engine and repeat step 708, flag the entry for user intervention, perform any other suitable processing steps, or any combination thereof.

In step 712, the system updates the knowledge graph based at least in part on the received information. In some implementations, the system updates information based on the information received from the query processing engine in step 710. In some implementations, the system updates information as illustrated for box 612 of FIG. 6. In some implementations, the system updates a missing data element identified in step 704 based on the information from step 710. In some implementations, the system replaces outdated information identified in step 704 based on the response from 710. In some implementations, updating the knowledge graph includes updating existing information, adding new information, or any combination thereof. In an example, the system identifies that a population value such as node 504 of FIG. 5 should be updated. In another example, the system may identify that a missing data element such as node 512 of FIG. 5 is incomplete.

Figure 8:
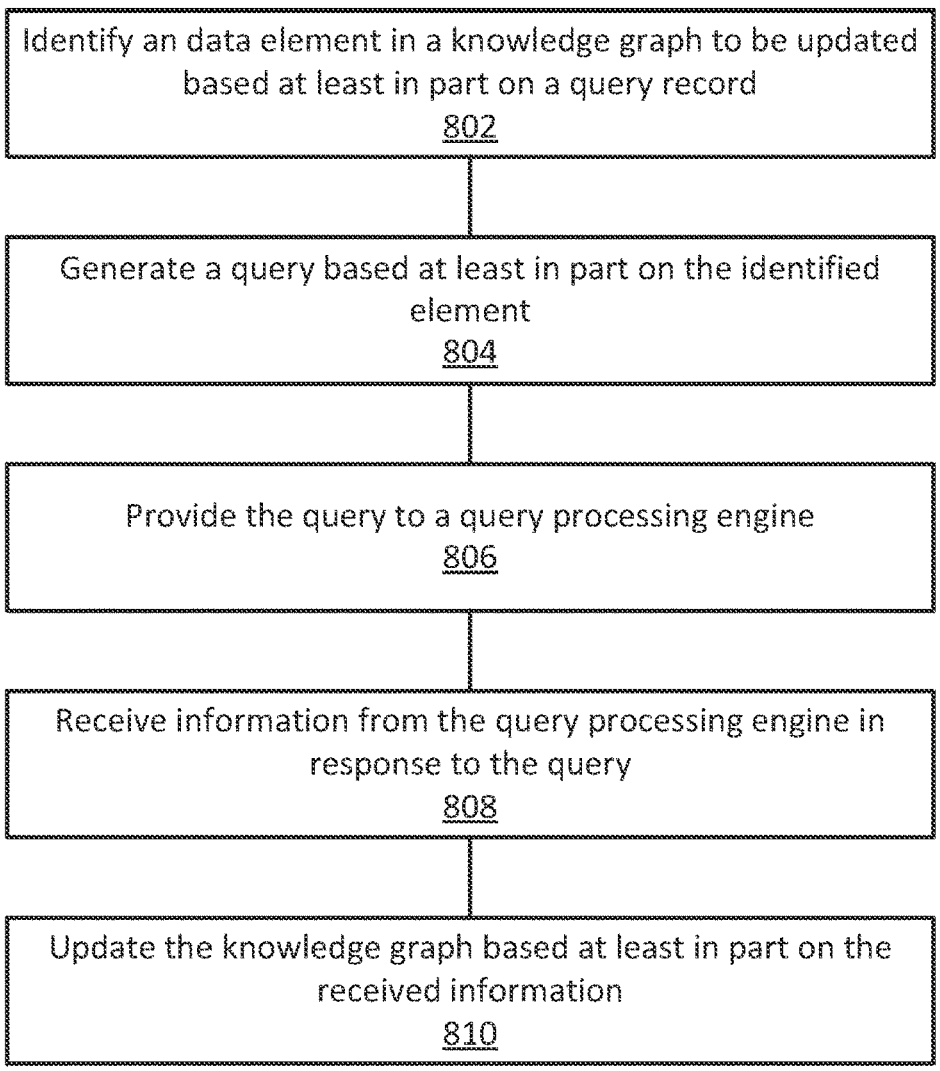
FIG. 8 shows a flow diagram of illustrative steps for updating a data graph based on a query record in accordance with some implementations of the present disclosure.

FIG. 8 shows flow diagram 800 including illustrative steps for updating a data graph based on a query record in accordance with some implementations of the present disclosure.

In step 802, the system identifies a data element to be updated based at least in part a query record. In some implementations, a data element to be updated may include incomplete data, outdated data, missing data, any other suitable data, or any combination thereof. A query record, as described above, includes one or more query logs, processed query logs, other suitable processed data related to searches and search history, any other suitable information, or any combination thereof. In some implementations, the system uses query records to identify data in a knowledge graph that is outdated, incorrect, incomplete, or otherwise not satisfactory to a user. For example, a user using a search engine may receive information from a knowledge graph before receiving additional search results based on an index of data on a network such as the Internet. Query records that reflect the user searching for further information after receiving information from the knowledge graph may be indicative of the knowledge graph information being incomplete or incorrect. In some implementations, the system uses that information to identify that the entity reference should be updated. In another example, the system uses query records that include searches for a piece of information that is not included in the knowledge graph to determine that the piece of information is missing.

In some implementations, the system determines an interval at which to perform regular updates based on query records. In an example, the system determines based on query records that a particular records needs to be updated daily based on how frequently query records do not match information in the knowledge graph. It will be understood that update intervals may be determined based on any suitable information, for example, user input, update intervals associated with a schema, any other suitable information, or any combination thereof. In an example, the system determines that information regarding the population of a particular country should be updated monthly based on query records. That information may be stored in a [Country] schema, such that the system updates the population for all countries at monthly intervals.

In step 804, the system generates a query based at least in part on the identified element. In some implementations, the system performs step 804 for the identified data element of step 802 as described for the missing data element of step 706 of FIG. 7.

In step 806, the system provides the query to a query processing engine. In some implementations, the system performs step 806 as described for step 708 of FIG. 7.

In step 808, the system receives information from the query processing engine in response to the query. In some implementations, the system performs step 808 as described for step 710 of FIG. 7.

In step 810, the system updates the knowledge graph based at least in part on the received information. In some implementations, the system performs step 810 as described for step 712 of FIG. 7.

It will be understood that the aforementioned steps of FIGS. 7 and 8 are exemplary and that in some implementations, steps may be added, removed, omitted, repeated, reordered, modified in any other suitable way, or any combination thereof.

Figure 9:
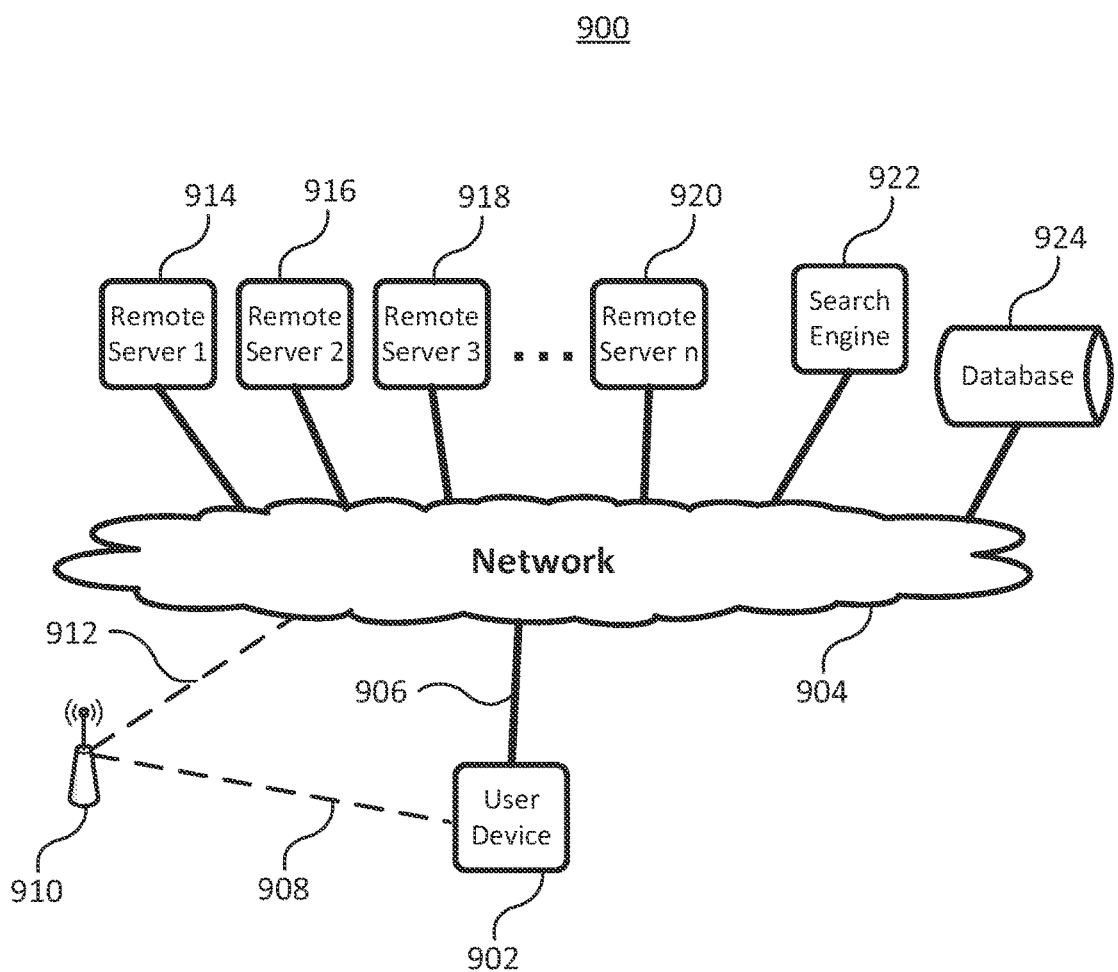
FIG. 9 shows an illustrative computer system in accordance with some implementations of the present disclosure.
Figure 10:
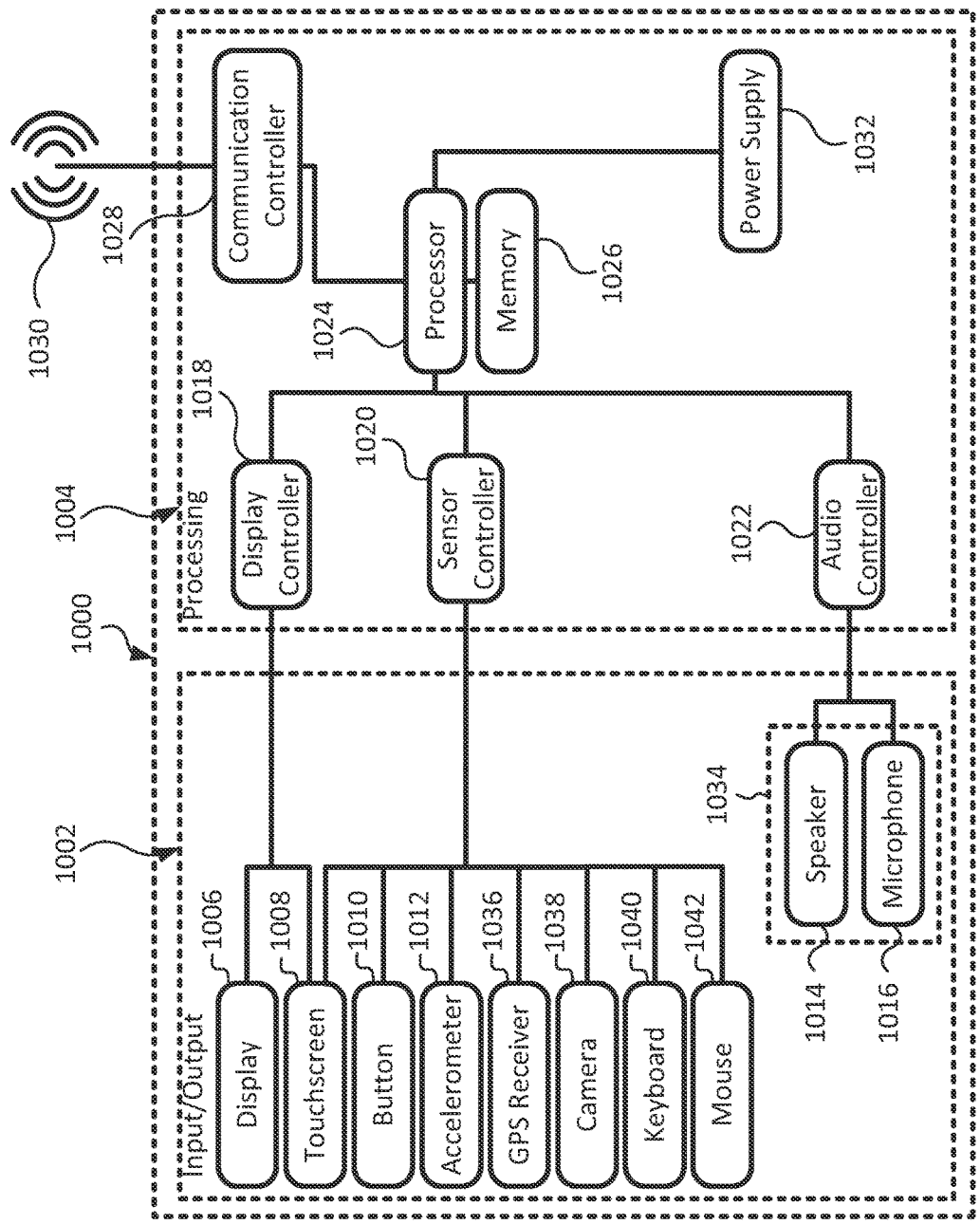
FIG. 10 is a block diagram of an illustrative computer device in accordance with some implementations of the present disclosure.

The following description and accompanying FIGS. 9 and 10 describe illustrative computer systems that may be used in some implementations of the present disclosure. It will be understood that elements of FIGS. 9 and 10 are merely exemplary and that any suitable elements may be added, removed, duplicated, replaced, or otherwise modified.

It will be understood that the system may be implemented on any suitable computer or combination of computers. In some implementations, the system is implemented in a distributed computer system including two or more computers. In an example, the system may use a cluster of computers located in one or more locations to perform processing and storage associated with the system. It will be understood that distributed computing may include any suitable parallel computing, distributed computing, network hardware, network software, centralized control, decentralized control, any other suitable implementations, or any combination thereof.

FIG. 9 shows illustrative computer system 900 in accordance with some implementations of the present disclosure. System 900 may include one or more computing device 902. In some implementations, computing device 902, and any other device of system 900, includes one or more computers and/or one or more processors. In some implementations, a processor includes one or more hardware processors, for example, integrated circuits, one or more software modules, computer-readable media such as memory, firmware, or any combination thereof. In some implementations, computing device 902 includes one or more computer-readable medium storing software, include instructions for execution by the one or more processors for performing the techniques discussed above with respect to FIGS. 7 and 8, or any other techniques disclosed herein. In some implementations, computing device 902 includes a smartphone, tablet computer, desktop computer, laptop computer, server, personal digital assistant (PDA), portable audio player, portable video player, mobile gaming device, other suitable user device capable of providing content, or any combination thereof.

Computing device 902 may be coupled to network 904 directly through connection 906, through wireless repeater 910, by any other suitable way of coupling to network 904, or by any combination thereof. Network 904 may include the Internet, a dispersed network of computers and servers, a local network, a public intranet, a private intranet, other coupled computing systems, or any combination thereof.

Computing device 902 may be coupled to network 904 by wired connection 906. Connection 906 may include Ethernet hardware, coaxial cable hardware, DSL hardware, T-1 hardware, fiber optic hardware, analog phone line hardware, any other suitable wired hardware capable of communicating, or any combination thereof. Connection 906 may include transmission techniques including TCP/IP transmission techniques, IEEE 1002 transmission techniques, Ethernet transmission techniques, DSL transmission techniques, fiber optic transmission techniques, ITU-T transmission techniques, any other suitable transmission techniques, or any combination thereof.

Computing device 902 may be wirelessly coupled to network 904 by wireless connection 908. In some implementations, wireless repeater 910 receives transmitted information from computing device 902 by wireless connection 908 and communicates it with network 904 by connection 912. Wireless repeater 910 receives information from network 904 by connection 912 and communicates it with computing device 902 by wireless connection 908. In some implementations, wireless connection 908 may include cellular phone transmission techniques, code division multiple access (CDMA) transmission techniques, global system for mobile communications (GSM) transmission techniques, general packet radio service (GPRS) transmission techniques, satellite transmission techniques, infrared transmission techniques, Bluetooth transmission techniques, Wi-Fi transmission techniques, WiMax transmission techniques, any other suitable transmission techniques, or any combination thereof.

Connection 912 may include Ethernet hardware, coaxial cable hardware, DSL hardware, T-1 hardware, fiber optic hardware, analog phone line hardware, wireless hardware, any other suitable hardware capable of communicating, or any combination thereof. Connection 912 may include wired transmission techniques including TCP/IP transmission techniques, IEEE 1002 transmission techniques, Ethernet transmission techniques, DSL transmission techniques, fiber optic transmission techniques, ITU-T transmission techniques, any other suitable transmission techniques, or any combination thereof. Connection 912 may include may include wireless transmission techniques including cellular phone transmission techniques, code division multiple access (CDMA) transmission techniques, global system for mobile communications (GSM) transmission techniques, general packet radio service (GPRS) transmission techniques, satellite transmission techniques, infrared transmission techniques, Bluetooth transmission techniques, Wi-Fi transmission techniques, WiMax transmission techniques, any other suitable transmission techniques, or any combination thereof.

Wireless repeater 910 may include any number of cellular phone transceivers, network routers, network switches, communication satellites, other devices for communicating information from computing device 902 to network 904, or any combination thereof. It will be understood that the arrangement of connection 906, wireless connection 908 and connection 912 is merely illustrative and that system 900 may include any suitable number of any suitable devices coupling computing device 902 to network 904. It will also be understood that any computing device 902, may be communicatively coupled with any user device, remote server, local server, any other suitable processing equipment, or any combination thereof, and may be coupled using any suitable technique as described above.

In some implementations, any suitable number of remote servers 914, 916, 918, 920, may be coupled to network 904. Remote servers may be general purpose, specific, or any combination thereof. One or more search engine servers 922 may be coupled to the network 904. In some implementations, search engine server 922 may include the knowledge graph, may include processing equipment configured to access the knowledge graph, may include processing equipment configured to receive search queries related to the knowledge graph, may include any other suitable information or equipment, or any combination thereof. One or more database servers 924 may be coupled to network 904. In some implementations, database server 924 may store the knowledge graph. In some implementations, where there is more than one knowledge graph, the more than one may be included in database server 924, may be distributed across any suitable number of database servers and general purpose servers by any suitable technique, or any combination thereof. It will also be understood that the system may use any suitable number of general purpose, specific purpose, storage, processing, search, any other suitable server, or any combination.

FIG. 10 is includes a block diagram of illustrative computing device 1000 in accordance with some implementations of the present disclosure. FIG. 10 includes computing device 1000. In some implementations, computing device 1000 corresponds to computing device 902 of FIG. 9, a remote computer illustrated in system 900 of FIG. 9, any other suitable computer corresponding to system 900 of FIG. 9, any other suitable device, or any combination thereof. In some implementations, computing device 1000 is an illustrative local and/or remote computer that is part of a distributed computing system. Computing device 1000 may include input/output equipment 1002 and processing equipment 1004. Input/output equipment 1002 may include display 1006, touchscreen 1008, button 1010, accelerometer 1012, global positions system (GPS) receiver 1036, camera 1038, keyboard 1040, mouse 1042, and audio equipment 1034 including speaker 1014 and microphone 1016. In some implementations, the equipment of computing device 1000 may be representative of equipment included in a smartphone user device. It will be understood that the specific equipment included in the illustrative computer system may depend on the type of user device. For example, the input/output equipment 1002 of a desktop computer may include a keyboard 1040 and mouse 1042 and may omit accelerometer 1012 and GPS receiver 1036. It will be understood that computing device 1000 may omit any suitable illustrated elements, and may include equipment not shown such as media drives, data storage, communication devices, display devices, processing equipment, any other suitable equipment, or any combination thereof.

In some implementations, display 1006 may include a liquid crystal display, light emitting diode display, organic light emitting diode display, amorphous organic light emitting diode display, plasma display, cathode ray tube display, projector display, any other suitable type of display capable of displaying content, or any combination thereof. Display 1006 may be controlled by display controller 1018 or by processor 1024 in processing equipment 1004, by processing equipment internal to display 1006, by other controlling equipment, or by any combination thereof. In some implementations, display 1006 may display data from a knowledge graph.

Touchscreen 1008 may include a sensor capable of sensing pressure input, capacitance input, resistance input, piezoelectric input, optical input, acoustic input, any other suitable input, or any combination thereof. Touchscreen 1008 may be capable of receiving touch-based gestures. Received gestures may include information relating to one or more locations on the surface of touchscreen 1008, pressure of the gesture, speed of the gesture, duration of the gesture, direction of paths traced on its surface by the gesture, motion of the device in relation to the gesture, other suitable information regarding a gesture, or any combination thereof. In some implementations, touchscreen 1008 may be optically transparent and located above or below display 1006. Touchscreen 1008 may be coupled to and controlled by display controller 1018, sensor controller 1020, processor 1024, any other suitable controller, or any combination thereof. In some implementations, touchscreen 1008 may include a virtual keyboard capable of receiving, for example, a search query used to identify data in a knowledge graph.

In some implementations, a gesture received by touchscreen 1008 may cause a corresponding display element to be displayed substantially concurrently (i.e., immediately following or with a short delay) by display 1006. For example, when the gesture is a movement of a finger or stylus along the surface of touchscreen 1008, the search system may cause a visible line of any suitible thickness, color, or pattern indicating the path of the gesture to be displayed on display 1006. In some implementations, for example, a desktop computer using a mouse, the functions of the touchscreen may be fully or partially replaced using a mouse pointer displayed on the display screen.

Button 1010 may be one or more electromechanical push-button mechanism, slide mechanism, switch mechanism, rocker mechanism, toggle mechanism, other suitable mechanism, or any combination thereof. Button 1010 may be included in touchscreen 1008 as a predefined region of the touchscreen (e.g., soft keys). Button 1010 may be included in touchscreen 1008 as a region of the touchscreen defined by the search system and indicated by display 1006. Activation of button 1010 may send a signal to sensor controller 1020, processor 1024, display controller 1020, any other suitable processing equipment, or any combination thereof. Activation of button 1010 may include receiving from the user a pushing gesture, sliding gesture, touching gesture, pressing gesture, time-based gesture (e.g., based on the duration of a push), any other suitable gesture, or any combination thereof.

Accelerometer 1012 may be capable of receiving information about the motion characteristics, acceleration characteristics, orientation characteristics, inclination characteristics and other suitable characteristics, or any combination thereof, of computing device 1000. Accelerometer 1012 may be a mechanical device, microelectromechanical (MEMS) device, nanoelectromechanical (NEMS) device, solid state device, any other suitable sensing device, or any combination thereof. In some implementations, accelerometer 1012 may be a 3-axis piezoelectric microelectromechanical integrated circuit which is configured to sense acceleration, orientation, or other suitable characteristics by sensing a change in the capacitance of an internal structure. Accelerometer 1012 may be coupled to touchscreen 1008 such that information received by accelerometer 1012 with respect to a gesture is used at least in part by processing equipment 1004 to interpret the gesture.

Global positioning system (GPS) receiver 1036 may be capable of receiving signals from global positioning satellites. In some implementations, GPS receiver 1036 may receive information from one or more satellites orbiting the earth, the information including time, orbit, and other information related to the satellite. This information may be used to calculate the location of computing device 1000 on the surface of the earth. GPS receiver 1036 may include a barometer (not shown) to improve the accuracy of the location. GPS receiver 1036 may receive information from other wired and wireless communication sources regarding the location of computing device 1000. For example, the identity and location of nearby cellular phone towers may be used in place of, or in addition to, GPS data to determine the location of computing device 1000.

Camera 1038 may include one or more sensors to detect light. In some implementations, camera 1038 may receive video images, still images, or both. Camera 1038 may include a charged coupled device (CCD) sensor, a complementary metal oxide semiconductor (CMOS) sensor, a photocell sensor, an IR sensor, any other suitable sensor, or any combination thereof. In some implementations, camera 1038 may include a device capable of generating light to illuminate a subject, for example, an LED light. Camera 1038 may communicate information captured by the one or more sensor to sensor controller 1020, to processor 1024, to any other suitable equipment, or any combination thereof. Camera 1038 may include lenses, filters, and other suitable optical equipment. It will be understood that computing device 1000 may include any suitable number of camera 1038.

Audio equipment 1034 may include sensors and processing equipment for receiving and transmitting information using acoustic or pressure waves. Speaker 1014 may include equipment to produce acoustic waves in response to a signal. In some implementations, speaker 1014 may include an electroacoustic transducer wherein an electromagnet is coupled to a diaphragm to produce acoustic waves in response to an electrical signal. Microphone 1016 may include electroacoustic equipment to convert acoustic signals into electrical signals. In some implementations, a condenser-type microphone may use a diaphragm as a portion of a capacitor such that acoustic waves induce a capacitance change in the device, which may be used as an input signal by computing device 1000.

Speaker 1014 and microphone 1016 may be contained within computing device 1000, may be remote devices coupled to computing device 1000 by any suitable wired or wireless connection, or any combination thereof.

Speaker 1014 and microphone 1016 of audio equipment 1034 may be coupled to audio controller 1022 in processing equipment 1004. This controller may send and receive signals from audio equipment 1034 and perform pre-processing and filtering steps before transmitting signals related to the input signals to processor 1024. Speaker 1014 and microphone 1016 may be coupled directly to processor 1024. Connections from audio equipment 1034 to processing equipment 1004 may be wired, wireless, other suitable arrangements for communicating information, or any combination thereof.

Processing equipment 1004 of computing device 1000 may include display controller 1018, sensor controller 1020, audio controller 1022, processor 1024, memory 1026, communication controller 1028, and power supply 1032.

Processor 1024 may include circuitry to interpret signals input to computing device 1000 from, for example, touchscreen 1008 and microphone 1016. Processor 1024 may include circuitry to control the output to display 1006 and speaker 1014. Processor 1024 may include circuitry to carry out instructions of a computer program. In some implementations, processor 1024 may be an integrated electronic circuit based, capable of carrying out the instructions of a computer program and include a plurality of inputs and outputs.

Processor 1024 may be coupled to memory 1026. Memory 1026 may include random access memory (RAM), flash memory, programmable read only memory (PROM), erasable programmable read only memory (EPROM), magnetic hard disk drives, magnetic tape cassettes, magnetic floppy disks optical CD-ROM discs, CD-R discs, CD-RW discs, DVD discs, DVD+R discs, DVD-R discs, any other suitable storage medium, or any combination thereof.

The functions of display controller 1018, sensor controller 1020, and audio controller 1022, as have been described above, may be fully or partially implemented as discrete components in computing device 1000, fully or partially integrated into processor 1024, combined in part or in full into combined control units, or any combination thereof.

Communication controller 1028 may be coupled to processor 1024 of computing device 1000. In some implementations, communication controller 1028 may communicate radio frequency signals using antenna 1030. In some implementations, communication controller 1028 may communicate signals using a wired connection, not shown. Wired and wireless communications communicated by communication controller 1028 may use Ethernet, amplitude modulation, frequency modulation, bitstream, code division multiple access (CDMA), global system for mobile communications (GSM), general packet radio service (GPRS), satellite, infrared, Bluetooth, Wi-Fi, WiMax, any other suitable communication configuration, or any combination thereof. The functions of communication controller 1028 may be fully or partially implemented as a discrete component in computing device 1000, may be fully or partially included in processor 1024, or any combination thereof. In some implementations, communication controller 1028 may communicate with a network such as network 904 of FIG. 9 and may receive information from a knowledge graph stored, for example, in database 924 of FIG. 9.

Power supply 1032 may be coupled to processor 1024 and to other components of computing device 1000. Power supply 1032 may include a lithium-polymer battery, lithium-ion battery, NiMH battery, alkaline battery, lead-acid battery, fuel cell, solar panel, thermoelectric generator, any other suitable power source, or any combination thereof. Power supply 1032 may include a hard wired connection to an electrical power source, and may include electrical equipment to convert the voltage, frequency, and phase of the electrical power source input to suitable power for computing device 1000. In some implementations of power supply 1032, a wall outlet may provide 920 volts, 60 Hz AC. A circuit of transformers, resistors, inductors, capacitors, transistors, and other suitable electronic components included in power supply 1032 may convert the 920V AC from a wall outlet power to 5 volts DC. In some implementations of power supply 1032, a lithium-ion battery including a lithium metal oxide-based cathode and graphite-based anode may supply 3.7V to the components of computing device 1000. Power supply 1032 may be fully or partially integrated into computing device 1000, or may function as a stand-alone device. Power supply 1032 may power computing device 1000 directly, may power computing device 1000 by charging a battery, may provide power by any other suitable way, or any combination thereof.

The foregoing is merely illustrative of the principles of this disclosure and various modifications may be made by those skilled in the art without departing from the scope of this disclosure. The above described implementations are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed:

1. A computer implemented method comprising the following operations performed by one or more processors:
   identifying, by one or more of the processors, an entity reference in a knowledge graph, wherein the entity reference corresponds to an entity type;
   identifying, by one or more of the processors, a missing data element associated with the entity reference, the missing data element reflecting a property of the entity reference for which no property value is currently assigned;
   generating, automatically by one or more of the processors in response to identifying the missing data element associated with the entity reference, a query based at least in part on the missing data element and the entity type;
   providing, by one or more of the processors, the query to a query processing engine;
   receiving information from the query processing engine in response to the query; and
   updating, by one or more of the processors in response to receiving information from the query processing engine, the knowledge graph based at least in part on the received information.

2. The method of claim 1, wherein identifying a missing data element comprises:
   comparing properties associated with the entity reference to a schema table associated with the entity type; and
   determining that the schema table includes the property of the entity reference for which no value is currently assigned.

3. The method of claim 1, wherein generating the query comprises generating a natural language query.

4. The method of claim 1, wherein generating the query comprises selecting, from the knowledge graph, disambiguation query terms associated with the entity reference, wherein the disambiguation query terms comprise property values associated with the entity reference, and wherein the query includes the disambiguation query terms and one or more terms associated with the missing data element.

5. The method of claim 1, wherein generating the query comprises selecting, from the knowledge graph, disambiguation query terms associated with the entity reference, wherein the disambiguation query terms comprise properties associated with the entity reference, and wherein the query includes the disambiguation query terms and one or more terms associated with the missing data element.

6. The method of claim 1, wherein updating the knowledge graph comprises updating the data graph to include information in place of the missing data element.

7. A system comprising:
   one or more computers configured to perform operations comprising:
   identifying, by one or more of the computers, an entity reference in a knowledge graph, wherein the entity reference corresponds to an entity type;
   identifying, by one or more of the computers, a missing data element associated with the entity reference, the missing data element reflecting a property of the entity reference for which no property value is currently assigned;

generating, automatically by one or more of the computers in response to identifying the missing data element associated with the entity reference, a query based at least in part on the missing data element and the entity type;

providing, by one or more of the computers, the query to a query processing engine;

receiving information from the query processing engine in response to the query; and updating, by one or more of the computers in response to receiving information from the query processing engine, the knowledge graph based at least in part on the received information.

8. The system of claim 7, wherein identifying a missing data element comprises:

comparing properties associated with the entity reference to a schema table associated with the entity type; and determining that the schema table includes the property of the entity reference for which no value is currently assigned.

9. The system of claim 7, wherein generating the query comprises generating a natural language query.

10. The system of claim 7, wherein generating the query comprises selecting, from the knowledge graph, disambiguation query terms associated with the entity reference, wherein the disambiguation query terms comprise property values associated with the entity reference, and wherein the query includes the disambiguation query terms and one or more terms associated with the missing data element.

11. The system of claim 7, wherein generating the query comprises selecting, from the knowledge graph, disambiguation query terms associated with the entity reference, wherein the disambiguation query terms comprise properties associated with the entity reference, and wherein the query includes the disambiguation query terms and one or more terms associated with the missing data element.

12. The system of claim 7, wherein updating the knowledge graph comprises updating the data graph to include information in place of the missing data element.

13. A computer-implemented method comprising the following operations performed by one or more processors:

identifying, by one or more of the processors, a data element in a knowledge graph to be updated based at least in part on a query record, wherein the identified element is determined to be outdated based on a conflict between the query record and a property value in the knowledge graph;

generating, automatically by one or more of the processors in response to identifying the data element in the knowledge graph to be updated, a query based at least in part on the outdated element;

providing, by one or more of the processors, the query to a query processing engine;

receiving, by one or more of the processors, information from the query processing engine in response to the query; and updating, by one or more of the processors in response to receiving information from the query processing engine, the knowledge graph based at least in part on the received information.

14. The method of claim 13, wherein the query record comprises data associated with one or more previously performed searches.

15. The method of claim 13, wherein generating the query comprises generating a natural language query.

16. The method of claim 13, wherein generating the query comprises selecting, from the knowledge graph, disambiguation query terms associated with the entity reference, wherein the disambiguation query terms comprise property values associated with the entity reference, and wherein the query includes the disambiguation query terms and one or more terms associated with the outdated data element.

17. The method of claim 13, wherein generating the query comprises selecting, from the knowledge graph, disambiguation query terms associated with the entity reference, wherein the disambiguation query terms comprise properties associated with the entity reference, and wherein the query includes the disambiguation query terms and one or more terms associated with the outdated data element.

18. The method of claim 13, wherein updating the knowledge graph comprises updating the data graph to include information in place of the outdated data element.

19. A system comprising:

one or more computers configured to perform operations comprising:

identifying, by one or more of the computers, a data element in a knowledge graph to be updated based at least in part on a query record, wherein the identified element is determined to be outdated based on a conflict between the query record and a property value in the knowledge graph;

generating, automatically by one or more of the computers in response to identifying the data element in the knowledge graph to be updated, a query based at least in part on the outdated element;

providing, by one or more of the computers, the query to a query processing engine;

receiving information from the query processing engine in response to the query; and updating, by one or more of the computers in response to receiving information from the query processing engine, the knowledge graph based at least in part on the received information.

20. The system of claim 19, wherein the query record comprises data associated with one or more previously performed searches.

21. The system of claim 19, wherein generating the query comprises generating a natural language query.

22. The system of claim 19, wherein generating the query comprises selecting, from the knowledge graph, disambiguation query terms associated with the entity reference, wherein the disambiguation query terms comprise property values associated with the entity reference, and wherein the query includes the disambiguation query terms and one or more terms associated with the outdated data element.

23. The system of claim 19, wherein generating the query comprises selecting, from the knowledge graph, disambiguation query terms associated with the entity reference, wherein the disambiguation query terms comprise properties associated with the entity reference, and wherein the query includes the disambiguation query terms and one or more terms associated with the outdated data element.

24. The system of claim 19, wherein updating the knowledge graph comprises updating the data graph to include information in place of the identified data element.

* * * * *